J. M. AHLGREN.
STORAGE BATTERY CONTAINER.
APPLICATION FILED MAR. 2, 1918.
1,384,816.  Patented July 19, 1921.
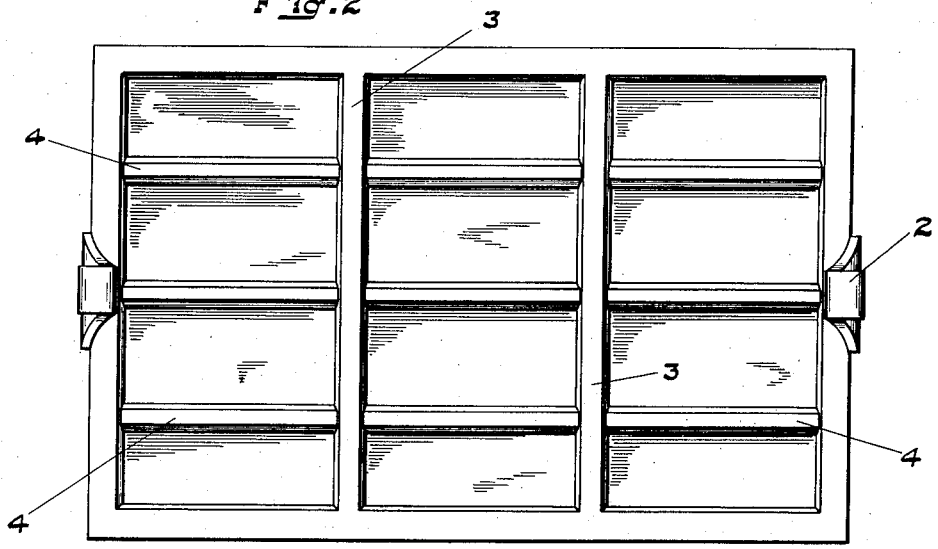
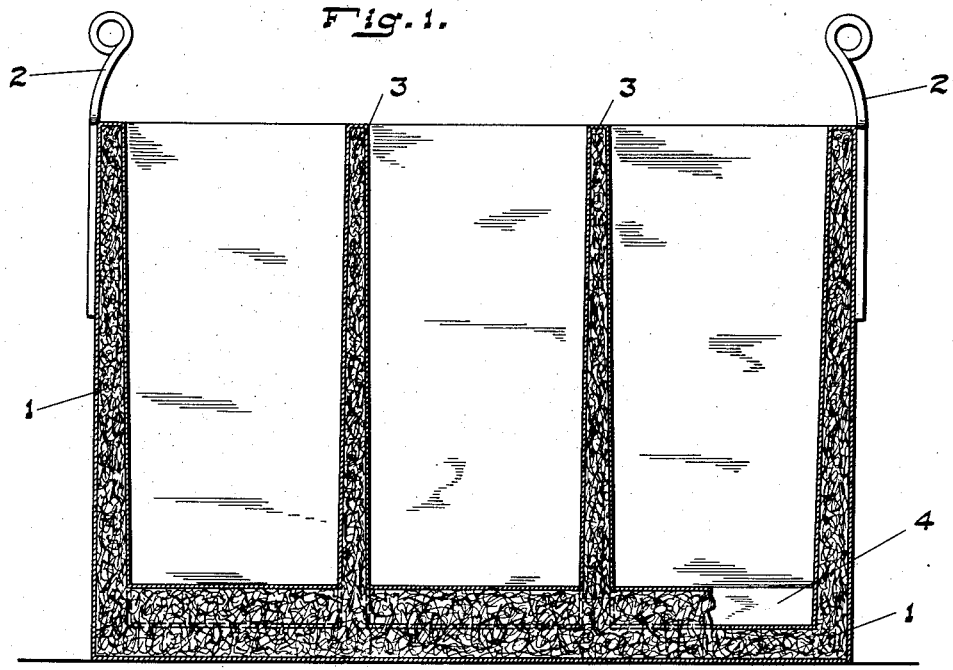

UNITED STATES PATENT OFFICE.

JOHN M. AHLGREN, OF INDIANAPOLIS, INDIANA, ASSIGNOR TO AHLBELL BATTERY CONTAINER CORPORATION, OF CHICAGO, ILLINOIS, A CORPORATION OF ILLINOIS.

STORAGE-BATTERY CONTAINER.

1,384,816.  Specification of Letters Patent.  Patented July 19, 1921.

Application filed March 2, 1918. Serial No. 220,103.

*To all whom it may concern:*

Be it known that I, JOHN M. AHLGREN, a citizen of the United States, residing at Indianapolis, Marion county, and State of Indiana, have invented and discovered certain new and useful Improvements in Storage-Battery Containers, of which the following is a specification.

My invention relates to storage battery containers and the object of the invention is to provide a container of this class in which the outer cell carrier and the cell walls themselves are made of a single integral structure so that the plates and the electrolytic material may be mounted directly within the container and the necessity for a box separate from the usual rubber cells employed obviated, together with the accompanying requirement for a permanent sealing composition on the box and cover.

With this object in view, my invention is embodied in preferable form in the construction hereinafter described and illustrated in the accompanying drawings.

In these drawings, Figure 1, is a vertical section showing a storage battery container embodying my invention, and Fig. 2, a plan view.

Referring to the drawings, the body of the container is made of a single integral piece of fibrous material such as papier-mâché and comprises a bottom, end walls and side walls. This body is indicated by the numeral 1. It is provided with attached handles 2, whereby it may be lifted and moved from place to place as is done with the ordinary battery box. Formed integrally with the body of the container are cross partitions 3, which separate the container into a series of compartments adapted to constitute cells in which the battery plates or grids are supported. The bottom of the body is also provided with a series of longitudinal parallel supporting ribs 4, adapted to support the plates and separators in the usual manner. The fibrous material is formed into shape by a press mold while the material is in a pulpy or plastic condition. While it is in this condition a protective lining which is resistant to heat, to the acid of the battery and to the electrical action, is applied to the body. This lining is made of pliable material so that it will yield to contraction and expansion due to changes in temperature occurring within the battery. The composition for this lining may consist of the ingredients commonly employed in making celluloid, together with elements capable of rendering the composition pliable and maintaining it in such condition while at the same time adapted for rendering the composition immune to the attack of the acid. The material of the lining is preferably formed by utilizing the following ingredients or their equivalents in substantially the proportions stated:—one gallon of soluble gun cotton, one gallon of camphor; these materials to be dissolved in a sufficient amount of alcohol or ether to reduce the composition to a consistency that will enable it to be drawn; about five ounces of paregoric which acts to close the pores after evaporation of the solvent and helps to maintain the pliability of the composition, substantially two pounds of gum chicle and five ounces of banana oil, the last named ingredient being added to cause the material to flow readily and to prevent undue adhesiveness of the composition, the gum chicle giving the composition toughness and pliability without adding any element which is liable to be attacked by the acid. The container thus formed is permitted to dry and harden. This composition is formed into the shape of the lining intended to be applied to the interior of the container and after the solvent has evaporated it will be in the form of a tough pliable envelop. The fibrous material in plastic condition is then forced into this envelop or lining and the container body permitted to dry whereupon the completed container will be in the form of a hard, rigid box lined with an acid proof and electrically resistant coating closely adhered to the body and serving to thoroughly protect the latter from the liquid of the battery or the action set up therein. After the body has been thus formed the exterior surface thereof may be likewise coated with the lining composition while the same is in liquid form. Such coating may be applied by a brush if desired.

A container thus constructed will not only be impervious to acid and the action of the electric current, but also, the lining owing to its pliable condition, will yield to contraction and expansion due to changes in temperature, which is a highly important point in the formation of a container. It has been found heretofore that in attempting to provide battery cells with plastic linings that the compositions proposed have been so brittle as to be subject to cracking under changes of temperature, thus permitting the acid to attack the body of the container.

Having thus described my invention, what I claim is:—

1. A battery container having an integral body of molded, pulpy, fibrous material forming an exterior receiving and handling box and also the bottom and side and end walls of the cell compartments and including vertical cross partitions of the same material integral with said body and coöperating with said bottom and walls to form the said compartments, and having a lining of substantial thickness covering the interior surfaces of the body and partitions and of pliable, acid resistant and heat resistant material, said lining being formed into an envelop to receive said container and having parts shaped to fit over the various walls and partitions of said container, said container being forced into said lining envelop while in a plastic state whereby said fibrous substance and lining will commingle and adhere to each other.

2. A battery container comprising a body composed of molded, pulpy, fibrous material the various walls and partitions of which are formed integral with said body, and an inner integral continuous lining of pliable acid and heat resistant material formed into an envelop to receive said container and having parts shaped to fit over the various walls and partitions of said container, said container being forced into said lining envelop while in a plastic state whereby said fibrous substance and lining will commingle and adhere to each other.

3. A method of forming lined battery containers consisting in forming an integral continuous lining of pliable acid and heat resistant material shaped to receive and fit over the parts of the container, and molding fibrous material to form various walls and partitions of the container and forcing said molded particles while in a plastic state into said lining structure and causing them to commingle and adhere to each other.

In witness whereof, I have hereunto set my hand and seal at Indianapolis, Indiana, this 4th day of February, A. D. nineteen hundred and eighteen.

JOHN M. AHLGREN. [L. S.]

Witnesses:
A. P. DOOLITTLE,
M. L. SHULER.